United States Patent [19]
Foster

[11] Patent Number: 6,056,332
[45] Date of Patent: May 2, 2000

[54] CLAMPING APPARATUS

[76] Inventor: Clark Foster, 23631 Wakefield Ct., Laguna Niguel, Calif. 92677

[21] Appl. No.: 09/265,311

[22] Filed: Mar. 9, 1999

[51] Int. Cl.[7] ................................................ F16L 23/10
[52] U.S. Cl. ........................ 285/367; 285/410; 285/420; 24/285
[58] Field of Search ............................. 24/285, 270, 273; 285/420, 407–411, 419, 373, 365, 366, 367

[56] References Cited

U.S. PATENT DOCUMENTS

| | | | |
|---|---|---|---|
| 1,839,761 | 1/1932 | Hutton | 285/411 |
| 2,397,438 | 3/1946 | Schmid | 285/420 |
| 2,689,141 | 9/1954 | Kiekhaefer | 285/129 |
| 3,703,190 | 11/1972 | Schoeffler | 33/3 |
| 3,964,774 | 6/1976 | Wollin et al. | 285/409 |
| 4,573,717 | 3/1986 | Peacock | 285/365 |
| 4,657,284 | 4/1987 | Fiori | 285/39 |
| 4,730,850 | 3/1988 | Takahashi | 285/3 |
| 4,739,542 | 4/1988 | Krzesicki | 24/285 |
| 4,915,418 | 4/1990 | Palatchy | 285/411 |
| 5,653,481 | 8/1997 | Alderman | 24/285 |

FOREIGN PATENT DOCUMENTS

| | | | |
|---|---|---|---|
| 7710772 | 4/1979 | Sweden | 285/420 |

*Primary Examiner*—Dave W. Arola
*Attorney, Agent, or Firm*—Eric Karich

[57] ABSTRACT

A clamping apparatus for engaging a pair of abutting flanges from a pair of pipes has a pivot end of a first clamp portion pivotally joined to a pivot end of a second clamp portion by a pivot pin, such that the first and second clamp portions may be mutually rotated into an open attitude for enabling one of the first and second clamp portions to be placed in contact with the abutting flanges. The pivot pin then enables the first and second clamp portions to be alternately mutually rotated into a closed attitude for enabling the other of the first and second clamp portions to be placed in contact with the abutting flanges, the clamping portions thereby being drawn into mutually opposing positions so as to place a clamp end of each of the clamp portions in mutual proximity. The clamping apparatus further includes a rocking bolt and rocking nut hingbly attached to one clamp end to removably engage a rocking slot in an opposite clamp end so as to secure the clamp portions in the closed attitude. Finally, the clamping apparatus includes a spring wire that is engaged with the clamping portions such that when the clamping portions are only partially open, the spring wire biases the clamping portions towards the closed attitude, but when the clamping portions are opened substantially, the spring wire biases the clamping portions towards the open attitude.

6 Claims, 5 Drawing Sheets

CLAMPING APPARATUS

BACKGROUND OF THE INVENTION

1. Field of the Invention

This invention relates generally to a clamp apparatus for connecting two pipes, and more particularly to a clamp apparatus having a spring wire that biases the clamp apparatus towards either an open or closed attitude.

2. Description of the Related Art

Many different methods are known for coupling together pipes. It is particularly known to provide pipes having flanges at their end, and to use a clamp to join the pipes together by clamping the two flanges together. Various clamps similar to the clamp used in the present invention have been well known in the art for years. A variety of patents disclose improved features for this well known clamp structure. Kiekhaefer, U.S. Pat. No. 2,689,141, discloses a lever that makes the ring clamp adjustable in diameter. Other improvement patents include the following: Takahashi, U.S. Pat. No. 4,730,850 (quick release coupling device); Krzesicki, U.S. Pat. No. 4,739,542 (safety coupling clamp); Peacock, U.S. Pat. No. 4,573,717 (toggle clamp); and Schoeffler, U.S. Pat. No. 3,703,190 (breakaway conductor pipe).

Users of this basic clamp have all encountered a common difficulty. It is difficult for one person to hold the two pipes together, and hold the clamp closed around the ends of the pipes, while also screwing the rocking nut down the rocking bolt to lock the clamp closed. Fiori, U.S. Pat. No. 4,657,284, discloses the state of the art clamp that attempts to solve this problem. The Fiori clamp uses two gripping levers biased apart with a coil spring to bias the clamp closed. While this eases the problem of assembly, it creates several new problems. First, a tool is needed to open the clamp. Second, there is no convenient method of keeping the clamp open for positioning the clamp around the proper pipes. Third, the gripping levers protrude and sometimes will not fit into the confined spaces through which the pipes run. Fourth, the coil spring required by the clamp is difficult to clean. Since these clamps are often used in locations where exacting standards of cleanliness are required, these coil springs are often not acceptable.

The prior art teaches a clamping apparatus that is biased closed with a coil spring acting upon two gripping levers. However, the prior art does not teach a clamping apparatus that is biased to either an open or closed attitude, depending upon the attitude of the clamping apparatus. The prior art also does not teach a clamping apparatus that uses a spring wire, rather than a coil spring, the spring wire being much easier to clean and maintain. Finally, the prior art does not teach a clamping apparatus that provides the desired positioning bias without requiring additional protruding elements, such as the gripping levers described above. The present invention fulfills these needs and provides further related advantages as described in the following summary.

SUMMARY OF THE INVENTION

The present invention teaches certain benefits in construction and use which give rise to the objectives described below.

The present invention provides a clamping apparatus for engaging a pair of abutting flanges from a pair of pipes. The apparatus includes a pivot end of a first clamp portion pivotally joined to a pivot end of a second clamp portion by a means for pivoting, such that the first and second clamp portions may be mutually rotated into an open attitude for enabling one of the first and second clamp portions to be placed in contact with the abutting flanges. The pivoting means then enables the first and second clamp portions to be alternately mutually rotated into a closed attitude for enabling the other of the first and second clamp portions to be placed in contact with the abutting flanges, the clamping portions thereby being drawn into mutually opposing positions so as to place a clamp end of each of the clamp portions in mutual proximity. The clamping apparatus further includes a means for clamping removably engaging the clamp ends so as to secure the clamp portions in the closed attitude. Finally, the clamping apparatus includes a means for urging that is engaged with the clamping portions such that when the clamping portions are only partially open, the urging means biases the clamping portions towards the closed attitude, but when the clamping portions are opened substantially, the urging means biases the clamping portions towards the open attitude.

A primary objective of the present invention is to provide a clamping apparatus having advantages not taught by the prior art.

Another objective is to provide a clamping apparatus that is biased to either an open or closed attitude, depending upon the attitude of the clamping apparatus.

Another objective is to provide a clamping apparatus that provides the desired attitude bias without requiring additional protruding elements or the use of any tools, thereby allowing the clamping apparatus to be used in tightly confined spaces.

A further objective is to provide a clamping apparatus that uses a spring wire that is easy to clean.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
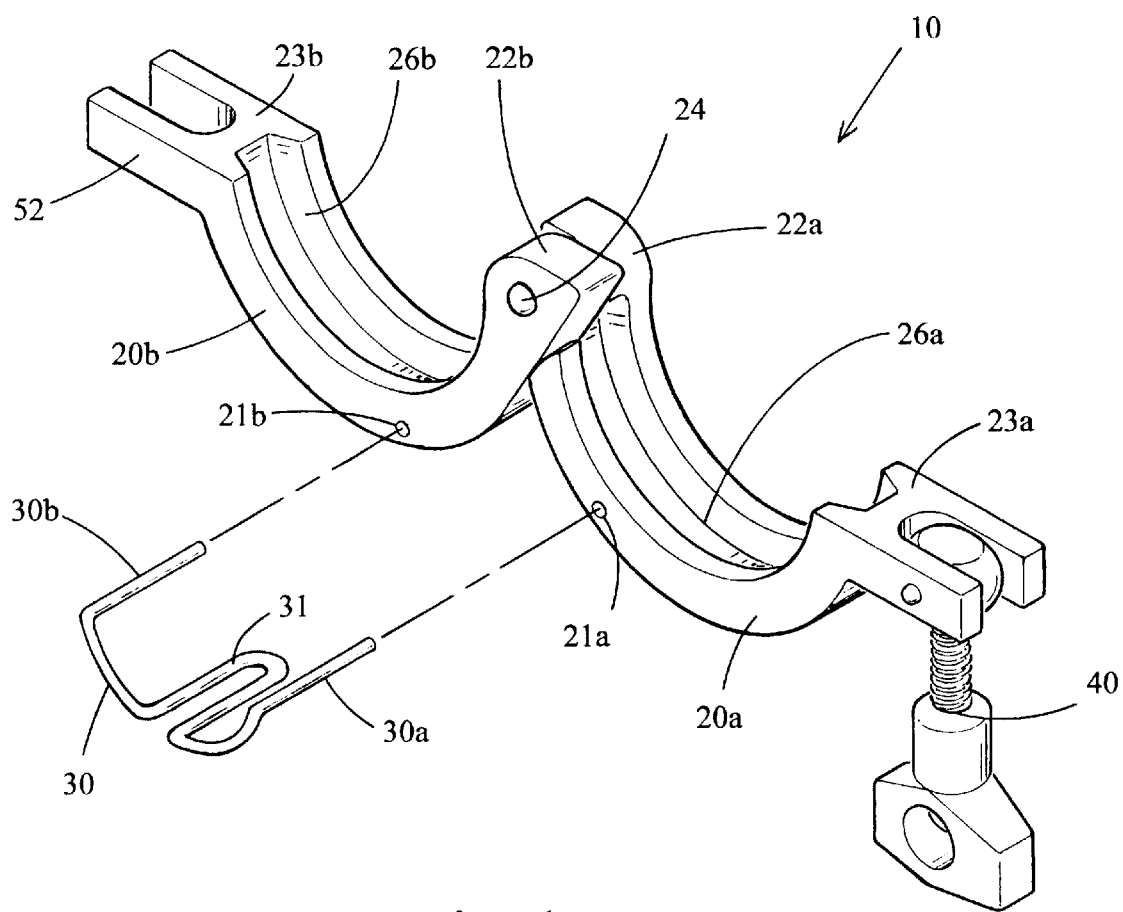
FIG. 1 is a partially exploded perspective view of the preferred embodiment of the clamping apparatus.

The above described drawing figures illustrate the invention, a clamping apparatus 10 for engaging a pair of abutting flanges 14a and 14b. FIG. 1 shows a partially exploded view of the preferred embodiment of the clamping apparatus 10 in the open attitude. In this view, a pivot end 22a of a first clamp portion 20a is pivotally joined to a pivot end 22b of a second clamp portion 20b by a means for pivoting 24, such that the first and second clamp portions 20a and 20b may be mutually rotated into an open attitude for enabling one of the first and second clamp portions 20a and 20b to be placed in contact with the abutting flanges 14a and 14b. As further described below, the means for pivoting 24 further enables the first and second clamp portions 20a and 20b to be alternately mutually rotated into a closed attitude. The first and second clamp portions 20a and 20b are preferably shaped like two complimentary half-circles. Each of the first and second clamp portions 20a and 20b is preferably provided with an inner face having a groove 26a and 26b, respectively, described in more detail below. The means for pivoting 24 that connects the pivot ends 22a and 22b is preferably a hinge formed by a pivot pin 24 through the pivot ends 22a and 22b. The underlying structure of the clamping apparatus 10 is described in Fiori, U.S. Pat. No. 4,657,284, hereby incorporated by reference in full.

Figure 5:
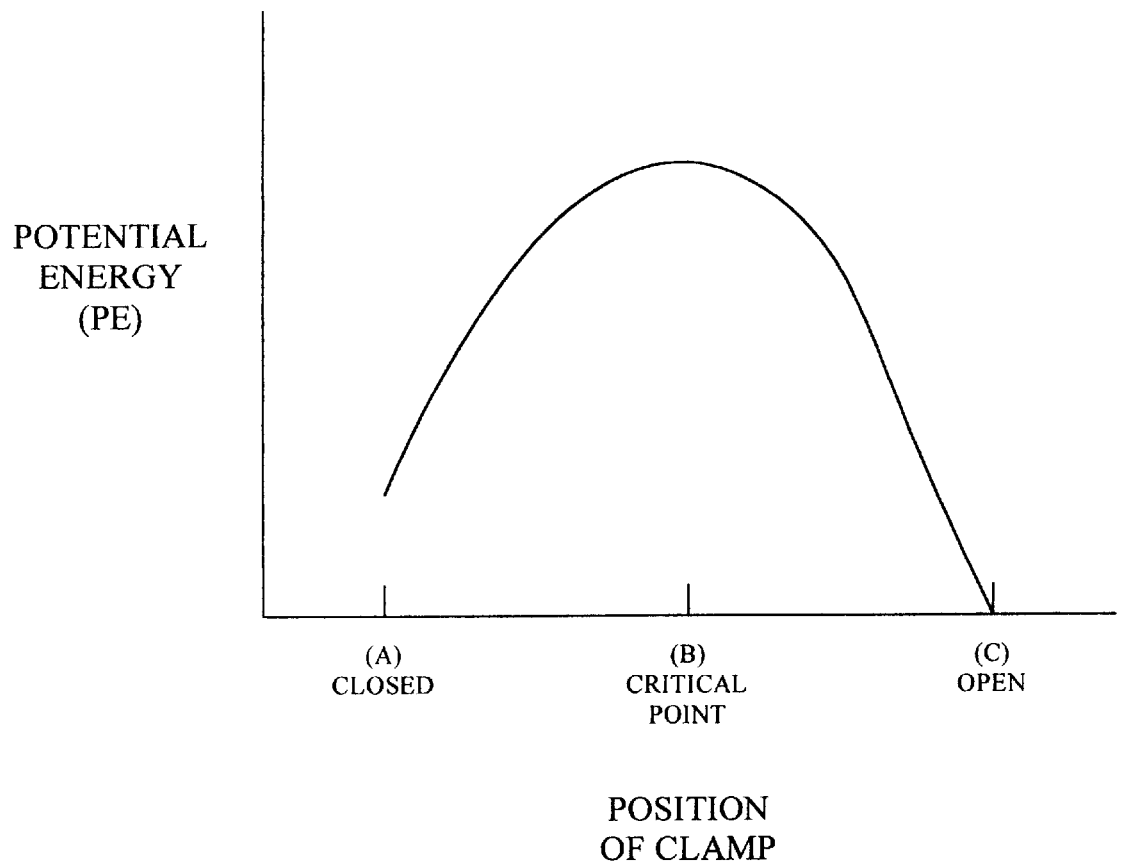
FIG. 5 is a graph showing the potential energy stored within the spring wire as the clamping apparatus is moved from the open attitude to the closed attitude.

As shown in FIG. 1, the clamping apparatus 10 further includes a means for urging 30 engaged with the first and second clamp portions 20a and 20b such that when the first and second clamp portions 20a and 20b are only partially open, the means for urging 30 biases the first and second clamp portions 20a and 20b towards the closed attitude, but when the first and second clamp portions 20a and 20b are opened substantially, the means for urging 30 biases the first and second clamp portions 20a and 20b towards the open attitude. The means for urging 30 is preferably a spring wire engaged at opposing ends 30a and 30b thereof with the first and second clamp portions 20a and 20b. The spring wire 30 preferably includes a spring wire loop 31. The spring wire loop 31 not only softens the spring action, it also provides a lever that the user can use to push the clamping apparatus 10 closed, thereby allowing the clamping apparatus 10 to be operated with one hand. The opposing ends 30a and 30b preferably engage the first and second clamp portions 20a and 20b at engagement holes 21a and 21b, respectively. When the clamping apparatus 10 is in the open attitude, the distance between the engagement holes 21a and 21b is preferably equal to the distance between the opposing ends 30a and 30b of the spring wire 30, thereby allowing the spring wire 30 to remain in its preferred shape. When the clamping apparatus 10 is in the closed attitude, the distance between the engagement holes 21a and 21b is either equal to, or preferably slightly greater than, the distance between the opposing ends 30a and 30b of the spring wire 30. This causes the spring wire 30 to be either relaxed (as in the open attitude) or slightly deformed. As the clamping apparatus 10 moves from the open to the closed attitude, the distance between the engagement holes 21a and 21b remains greater than in either the open or closed attitudes, thereby causing the spring wire 30 to become strained, with the resilient nature of the spring wire 30 biasing the first and second clamp portions 20a and 20b towards either the open or the closed attitude. When the spring wire 30 maintains some bias in the closed attitude, it causes the clamping apparatus 10 to forcibly hold itself closed, a desirable trait in clamping apparatus 10. A graph showing the potential energy stored within the spring wire 30 is shown in FIG. 5. The spring wire 30 is preferably a single curved wire, without coils. The spring wire 30 is preferably bent to conform to the shape of the first and second clamp portions 20a and 20b when they are in the closed attitude, thereby allowing the clamping apparatus 10 to fit closely against the pipes 12a and 12b without presenting any protruding elements. Since the clamping apparatus 10 often must fit into confined spaces with the pipes 12a and 12b, it is important that there by no protruding parts.

Figure 2:
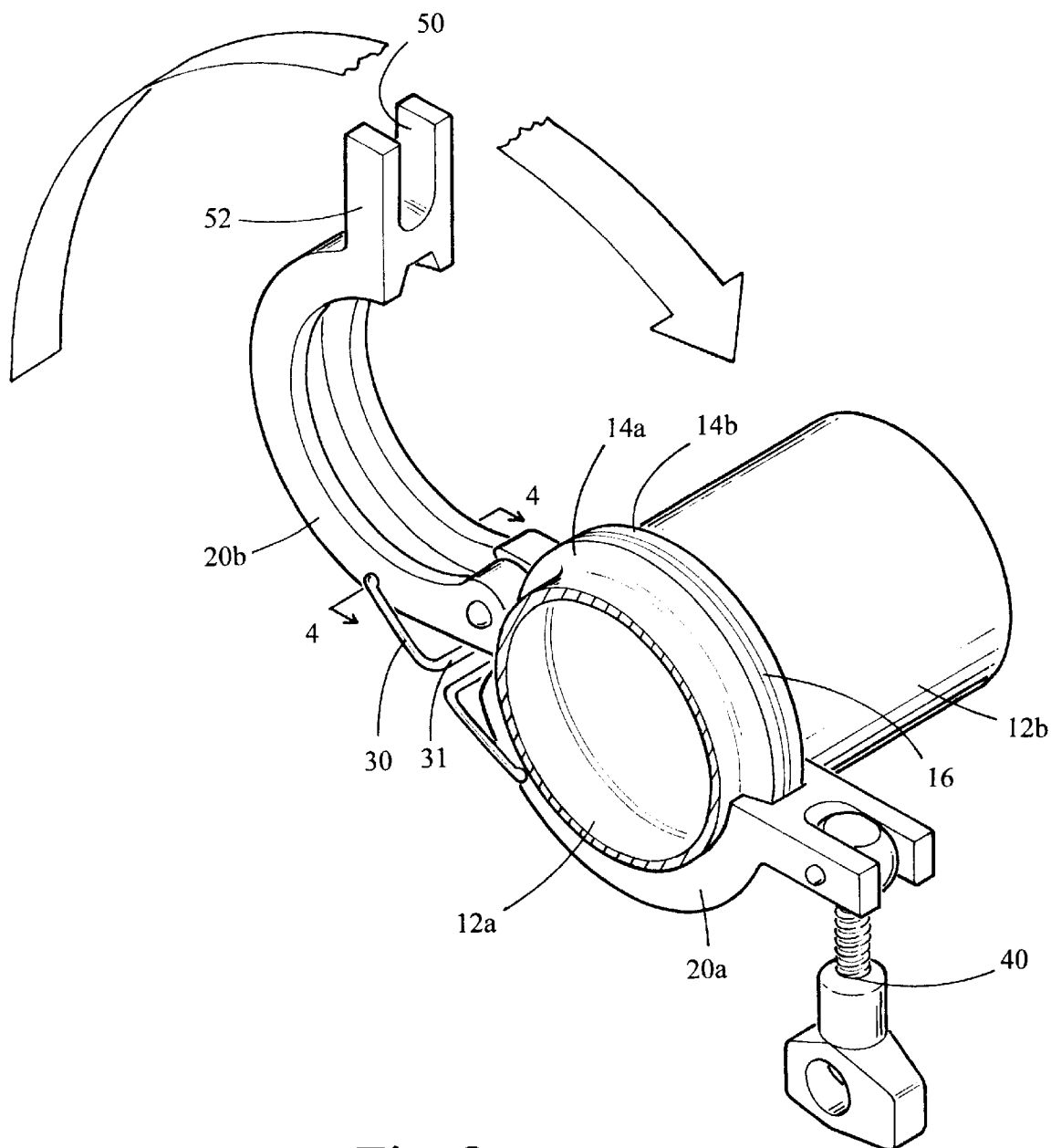
FIG. 2 is a perspective view of the fully assembled clamping apparatus as it is being attached to a pair of pipes.
Figure 3:
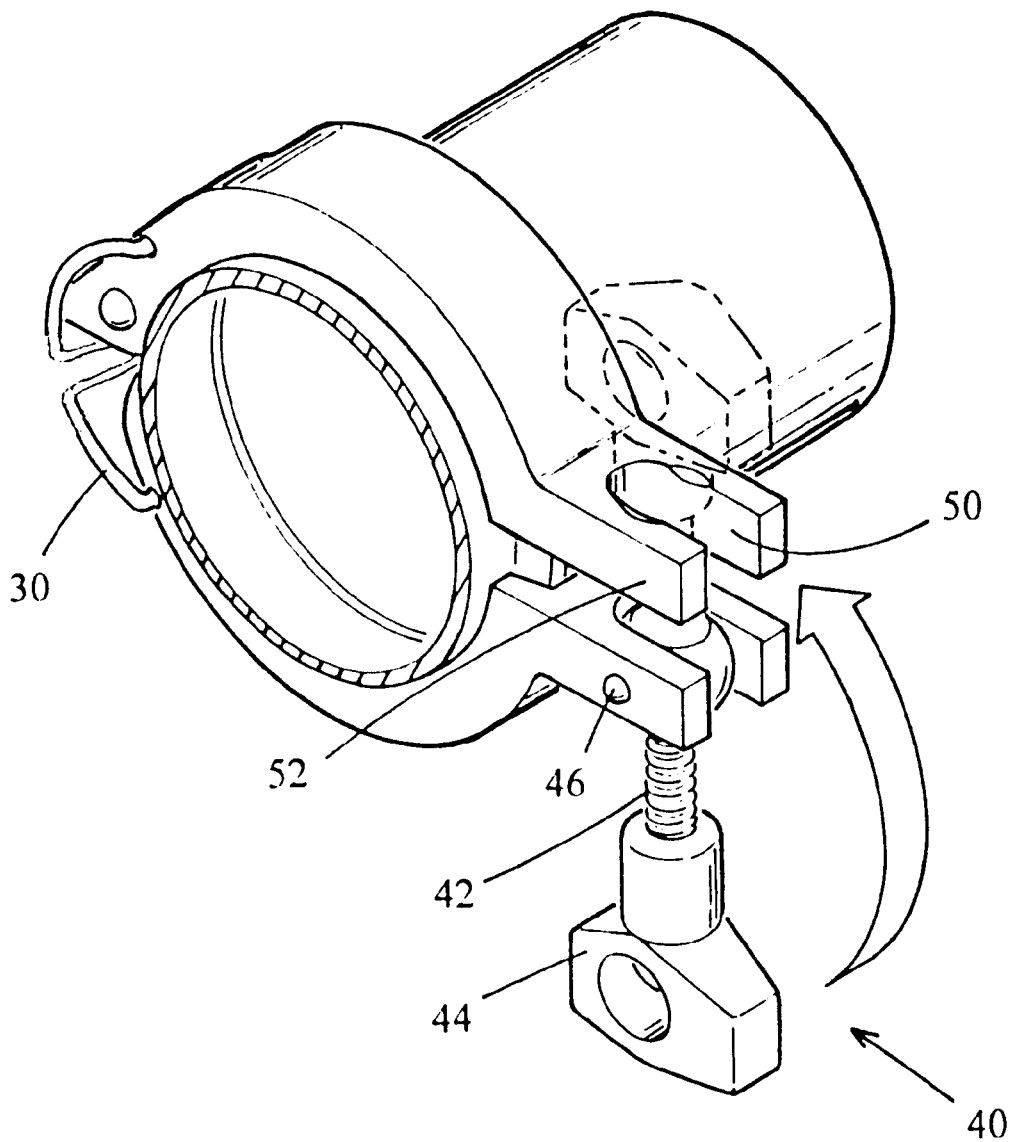
FIG. 3 is a perspective view thereof once the clamping apparatus has been moved to its closed attitude.
Figure 4:
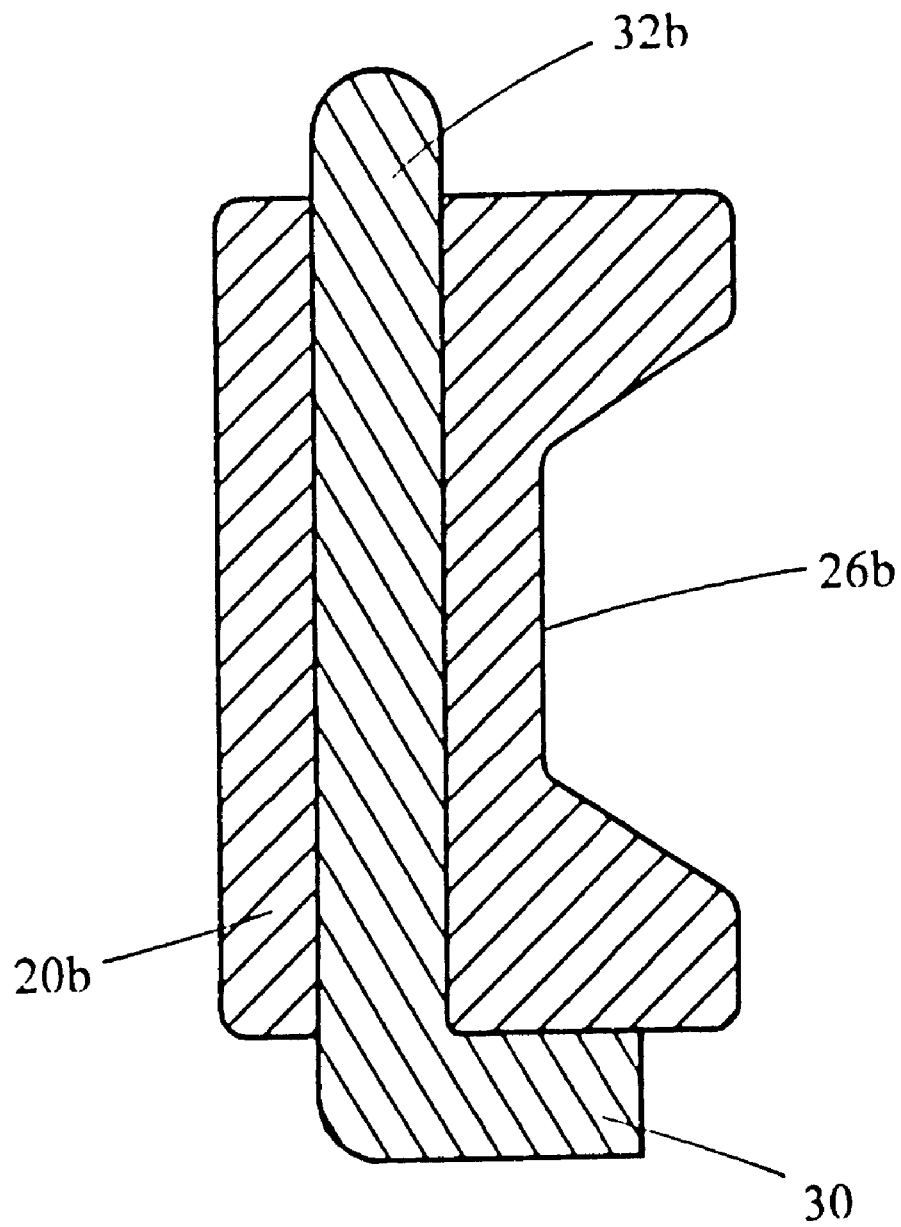
FIG. 4 is a sectional view thereof taken along line 4—4 in FIG. 2.

As shown in FIGS. 2 and 3, the pivoting means 24 further enables the first and second clamp portions 20a and 20b to be alternately mutually rotated into a closed attitude for enabling the other of the first and second clamp portions 20a and 20b to be placed in contact with the abutting flanges 14a and 14b, the clamping portions 20a and 20b thereby being drawn into mutually opposing positions so as to place a clamp end 23a and 23b of each of the clamp portions 20a and 20b in mutual proximity. FIG. 2 shows the adjacent ends of two pipes 12a and 12b in the process of being clamped together by the clamping apparatus 10. The clamping apparatus 10 locks the two flanges 14a and 14b together, preferably with a gasket 16 therebetween. In this view, the clamping apparatus 10 is shown with the first clamp portion 20a positioned to capture the abutting flanges 14a and 14b in its groove 26a, with the second clamp portion 20b in the process of moving from the open attitude to the closed attitude. As shown in FIG. 2, as the clamping apparatus 10 is moved out of the open position and towards the closed position, the spring wire 30 in stretched out of its preferred shape. In the open attitude, the spring wire 30 is resting in its preferred shape and it contains no potential energy. When the user begins to close the clamping apparatus 10, the spring wire 30 is stretched out of its preferred shape. As shown in FIG. 5, the resilient nature of the spring wire 30 stores potential energy as the clamping apparatus moves from the open attitude towards the closed attitude. At the critical point, midway between the open and closed attitudes, the spring wire 30 contains the highest level of potential energy, after which the spring wire 30 slowly returns towards its preferred shape and releases the potential energy. In the closed attitude, the spring wire 30 contains little to no potential energy, although it is preferred that the spring wire 30 be deformed slightly in the closed attitude, thereby providing the clamping apparatus 10 with a residual bias that serves to hold the clamping apparatus 10 snugly closed.

FIG. 3 shows the clamping apparatus 10 in the closed attitude. In this position, the clamp portions securely hold the pipes 12a and 12b together by locking the flanges 14a and 14b against each other, within the grooves 26a and 26b of the first and second clamp portions 20a and 20b. As described above, the spring wire 30 preferably biases the clamping apparatus 10 towards remaining in the closed attitude; however, the strength of the spring force is generally not enough to reliable lock the two pipes 12a and 12b together. The clamping apparatus 10 preferably further includes a means for clamping 40 that removably engages the clamp ends 23a and 23b so as to secure the clamp portions 20a and 20b in the closed attitude. The means for clamping 40 is preferably a rocking bolt 42 that removably engages a rocking slot 50. The rocking bolt 42 is preferably pivotally connected to the first clamp portion 20a, at the clamp end 23a, with a hinge pin 46 that is parallel to the pivot pin 24. When the clamping apparatus 10 is in the closed attitude, as shown in FIG. 3, the rocking bolt 42 can be located in the rocking slot 50, as indicated in phantom. The rocking slot 50 is preferably formed in a horse-shoe 52 radially extending from the clamp end 23b of the second clamp portion 20b. A rocking nut 44 screwed onto the rocking bolt 42 is responsible for the tightening of the clamp apparatus 10 by bearing against the horse-shoe 52. The force exerted by the rocking nut 44 on the horse-shoe 52 has the effect of pivoting the first and second clamp portions 20a and 20b about the pivot pin 24, while moving them together, thereby locking the pair of abutting flanges 14a and 14b tightly together.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A clamping apparatus for engaging a pair of abutting flanges, the apparatus comprising:

a pivot end of a first clamp portion pivotally joined to a pivot end of a second clamp portion by a means for pivoting, such that the first and second clamp portions may be mutually rotated into an open attitude for enabling one of the first and second clamp portions to be placed in contact with the abutting flanges;

the pivoting means further enabling the first and second clamp portions to be alternately mutually rotated into a closed attitude for enabling the other of the first and second clamp portions to be placed in contact with the abutting flanges, the clamping portions thereby being drawn into mutually opposing positions so as to place a clamp end of each of the clamp portions in mutual proximity;

a means for clamping removably engaging the clamp ends so as to secure the clamp portions in the closed attitude; and a means for urging engaged with the clamping portions such that when the clamping portions are only partially open, the urging means biases the clamping portions towards the closed attitude, but when the clamping portions are opened substantially, the urging means biases the clamping portions towards the open attitude.

2. The clamping apparatus of claim 1 wherein the means for urging is a spring wire hingably attached to each of the clamping portions.

3. A clamping apparatus for engaging a pair of abutting flanges, the apparatus comprising:

a pivot end of a first clamp portion pivotally joined to a pivot end of a second clamp portion by a means for pivoting, such that the first and second clamp portions may be mutually rotated into an open attitude for enabling one of the first and second clamp portions to be placed in contact with the abutting flanges;

the pivoting means further enabling the first and second clamp portions to be alternately mutually rotated into a closed attitude for enabling the other of the first and second clamp portions to be placed in contact with the abutting flanges, the clamping portions thereby being drawn into mutually opposing positions so as to place a clamp end of each of the clamp portions in mutual proximity;

a means for clamping removably engaging the clamp ends so as to secure the clamp portions in the closed attitude; and a means for urging engaged at opposing ends thereof with the clamping portions such that the urging means is relaxed in both the open and the closed attitudes of the clamp portions and is strained therebetween for enabling the clamping portions to be preferably in either the open or the closed attitude.

4. The clamping apparatus of claim 3 wherein the means for urging is a spring wire hingably attached to each of the clamping portions.

5. A combination clamping apparatus comprising:

a pair of abutting flanges;

a removable clamp comprising a pivot end of a first clamp portion pivotally joined to a pivot end of a second clamp portion by a means for pivoting, such that the first and second clamp portions may be mutually rotated into an open attitude with one of the first and second clamp portions in contact with the abutting flanges;

the pivoting means further enabling the first and second clamp portions to be alternately mutually rotated into a closed attitude with the other of the first and second clamp portions in contact with the abutting flanges, the clamping portions thereby being drawn into mutually opposing positions with a clamp end of each of the clamp portions in mutual proximity;

a means for clamping removably engaging the clamp ends to secure the clamp portions in the closed attitude engaging the pair of abutting flanges; and a means for urging engaged at opposing ends thereof with the clamping portions such that the urging means is relaxed in both the open and the closed attitudes of the clamp portions and is strained therebetween for enabling the clamping portions to be preferably in either the open or the closed attitude.

6. The clamping apparatus of claim 5 wherein the means for urging is a spring wire hingably attached to each of the clamping portions.

* * * * *